Sept. 25, 1945.  V. R. PAWELSKY  2,385,536
CONTROL FOR FLOOR FURNACES
Filed July 19, 1941

INVENTOR.
VERNON R. PAWELSKY
BY Cecil F. Arens
ATTORNEY.

Patented Sept. 25, 1945

2,385,536

UNITED STATES PATENT OFFICE 2,385,536

CONTROL FOR FLOOR FURNACES

Vernon R. Pawelsky, Milwaukee, Wis., assignor to Automatic Products Company, Milwaukee, Wis., a corporation of Wisconsin Application July 19, 1941, Serial No. 403,128

10 Claims. (Cl. 74—2)

This invention relates to a means for controlling the grill temperature of a floor furnace and is particularly adapted to that type furnace wherein the fuel supply to the burner is regulated by a constant level valve such as shown and fully described in Patent 2,317,063, issued to Roy W. Johnson, on April 20, 1943.

Heretofore there has been the hazard of excessively high temperatures in the grill of floor furnaces because of the absence of a suitable temperature unit control device, but the present invention proposes to remove this objection by the use of a heat sensitive strip disposed in the grill at a selected spot. The excessively high temperatures encountered before the advent of this novel invention made it extremely dangerous for small children playing on the floor and also proved injurious to rugs and highly finished floors in the vicinity of the grill.

One of the important objects of the invention lies in the provision of a means for limiting the temperature of the grill to a pre-determined safe heat.

Another object of this invention is the provision of a temperature responsive device which may be located in any part of the grill above the furnace and control the regulation of the fuel supply to the burner.

A still further important improvement lies in the use of a device of this invention which may be placed in one part of the grill while controlling the temperature in still another part of the grill.

Another important object of the invention is to provide a device simple in construction, cheap to manufacture, and yet reliable in operation.

A still further object resides in the provision of a temperature limiting device disposed in the grill of a floor furnace which will act to shut off the oil independently of other controls adapted to regulate the oil flow to the burner.

My invention further resides in the combination, construction and arrangement of parts shown in the accompanying drawing, and while I have illustrated therein preferred embodiments it is understood that the same are susceptible of modification and change without departing from the spirit of my invention.

Figure 1:
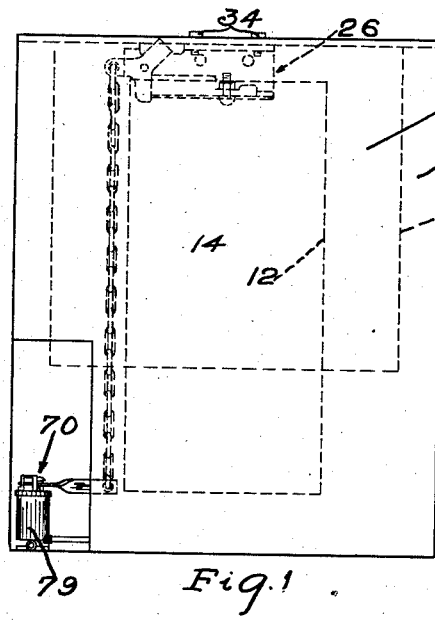
Figure 1 is a side elevational view of a floor furnace having the embodiment of the present invention disposed therein.
Figure 3:
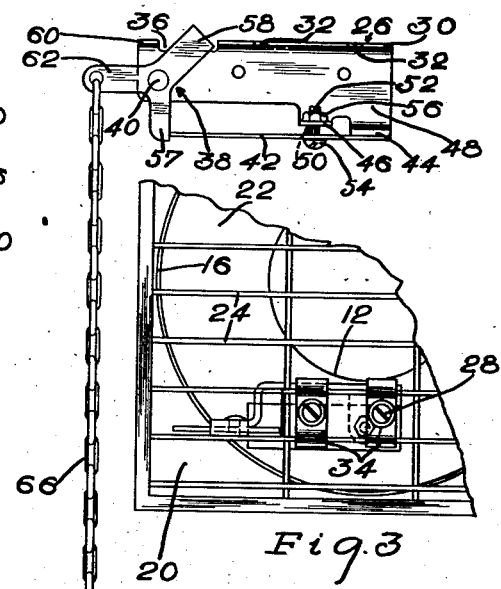
Figure 3 is a fragmentary, top plan view of the floor furnace illustrated in Figure 1 showing a method of clamping the temperature responsive control to the grill of the furnace.

Referring in detail to the drawing and more particularly to Figure 1 the illustrated embodiment of my novel invention is shown disposed in a floor furnace represented generally by the numeral 10. The furnace comprises an inner centrally disposed, closed top, casing 12 which provides a combustion chamber 14 for an oil burner (not shown) mounted directly under the bottom of the casing 12. An intermediate casing 16 is located between the inner casing 12 and an outer casing 18. The intermediate casing 16 forms two compartments 20 and 22 one for the incoming or cool air and the other for the outgoing or heated air respectively. A grill 24 disposed in the floor and mounted above the furnace 10 is designed to admit air from the room to be heated and to emit heated air to the room.

To control the temperatures at the grill 24 or the temperature in any zone in which a predetermined temperature condition is to be maintained a heat responsive device designated generally by the numeral 26 is removably secured to the grill by screws 28 the threaded portions of which pass through the straps 34 and threadedly interengage the heat responsive device 26 at its top portion 30 which portion is drilled and tapped at 32 for the reception of the screws 28. The top 30 has a cut out portion 36 to allow for the rotation of the Y lever 38 about a bearing 40 when the bimetal 42 is bowed downwardly to release the Y lever. This temperature responsive element or bimetal 42 is fixed to a bottom portion 44 in some suitable manner such as welding. The bimetallic element 42 is calibrated to expand at a pre-determined temperature. A second bottom portion 46 is struck out from the side wall 48 and is provided with a hole 50 tapped for the reception of a threaded shank 52 the end of which is enlarged at 54 to form a bearing surface for the bimetal 42. This enlarged headed end of the shank 52 is swivelly interconnected with the bimetallic strip.

This second bottom portion 46 lies in another horizontal plane removed from the bottom portion 44 to which the bimetal 42 is fixed. This difference in level permits the adjustment of the bimetal to the desired grill temperature range by turning the set screw 52 and then retaining it in the selected position by tightening the locknut 56.

The bimetal 42 holds the Y lever from rotation by engaging the latching finger 57. When the bimetal 42 releases the Y lever finger 57 for rotation it revolves in a counterclockwise direction until the reset finger 58 contacts the stop 60 at which time the downward movement of the connecting finger 62 is arrested. The elements 60, 30, 44 and 46 are an integral part of the side wall 48. This plate comprised of all these integral parts may be made from a flat stamping and the bottom and top portions formed thereon by any suitable method. The Y lever 38 is rotatably secured to the side wall 48 in any suitable manner such as riveting.

Figure 2:
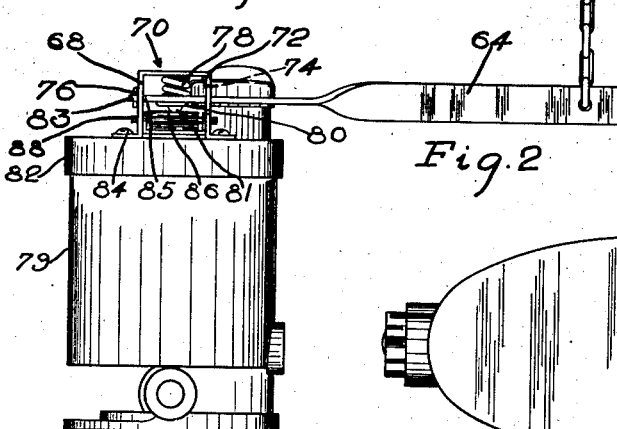
Figure 2 is an enlarged view of the embodiment of my invention shown in Figure 1 but removed from the floor furnace for purposes of clarity.
Figure 4:
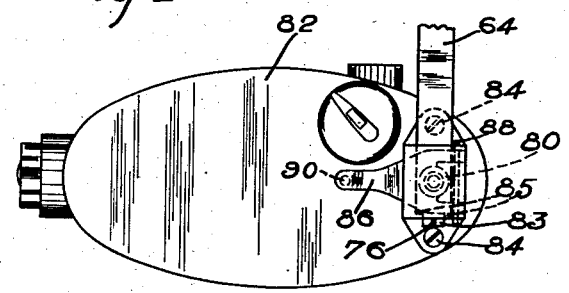
Figure 4 is a top plan view of a constant level valve illustrated in Figure 2 showing the lever arrangement for controlling the flow of oil through the valve by the novel means of this invention.

The rotation of the Y lever counterclockwise rotates the operating lever arm 64, which is normally held up by the chain 66, or other flexible connections, in a clockwise direction as viewed in Figures 1 and 2. The operating lever arm 64 is pivotally mounted or fulcrumed in the vertical wall 68 of the U shaped bracket 70. The end portion 83 of the operating lever 64 which projects thru the vertical wall 68 is slightly less in width than the adjacent end of the same lever so as to form abutment portions 85 which ride against the vertical wall 68. These abutment portions 85 form the bearing for the operating lever 64. The opposite vertical wall 72 is slotted at 74 to permit the passage of the arm 64 and to allow for its upwardly and downwardly movement. The operating arm 64 is held in the U shaped bracket 70 by any suitable means such as a key 76. A spring 78 is interposed between the operating arm 64 and the top of the U shaped supporting bracket 70 and urges the operating lever clockwise. A depression 80 in the operating arm 64 retains the spring in proper relationship. The bracket 70 is fastened to the top 82 of the constant level valve casing 79 in any suitable manner such as screws 84.

A second lever arm 86 is pivotally mounted in the supporting bracket 70 below the operating lever arm 64. A shaft 88 is fixedly maintained in the vertical walls 68 and 72 of the bracket 70 and provides a fulcrum for the second lever arm 86. This second lever arm 86 floats freely on the valve operating pin 90 (the operation of this pin and the metering valve mechanism of the constant level valve in regulating the flow of oil to the burner forms no part of the invention per se and is fully disclosed and claimed in the patent referred to above) which pin operates to shut off the oil to the burner (not shown) when it is in a down position or permits the passage of oil to the burner when the pin 90 is in raised position. The second lever arm 86 is only free to float on the pin 90 as described, so long as the Y lever arm is held from rotation as shown in Figure 2. When the Y lever arm is released, the operating lever rotates in clockwise direction which urges the second lever arm 86 downwardly by pressing against said second lever arm at a point 81. This floating feature permits the use of this device with other controls which operate on the pin 90.

The finger 62 and arm 64 do not have to be mounted in vertical alignment as shown but may be disposed in other relationships and connected by means of pulleys or the like.

Figure 5:
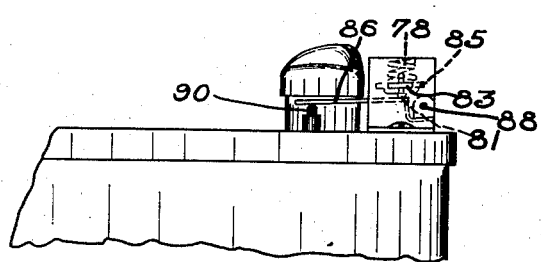
Figure 5 is a fragmentary side elevational view of the device shown in Figure 4.
Figure 6:
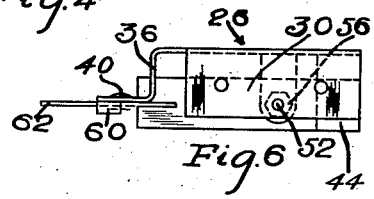
Figure 6 is a top plan view of the temperature responsive assembly of the device of this invention.

The operation of the device of this invention is thusly: When the temperature of the grill has reached a pre-determined heat, the bimetal, which has been calibrated and then adjusted to the desired condition by means of adjusting screw 52, warps downwardly releasing the Y lever arm 58 which rotates the Y lever counterclockwise and allows the operating arm 64 to rotate in a clockwise direction. The operating arm is caused to rotate not only from its own weight but due to an additional downward component of force exerted by the spring 78 interposed between the bracket 70 and arm 64. The rotation of this operating lever 64 bears on the second lever arm 86 (best shown in Figures 2 and 5) at 81 and rotates it about the pivot 88 and causes the second lever arm to urge the pin 90 downwardly which pin controls the metering valve for regulating fuel to the burner. After the fuel supply to the burner has been shut off the bimetal will cool and the control can now be reset for operation by rotating the Y lever in a clockwise direction until the vertical arm 57 again engages the bimetal 42.

Having described the invention, I claim:

1. A heat responsive device comprising a side wall, a bottom portion, a second bottom portion disposed in another horizontal plane from the first mentioned bottom portion, a top portion, having means associated therewith for fastening said heat responsive means into place, a rotatable lever arm pivotally fixed to said side wall, a stop for said lever arm and a bimetallic strip welded to said first mentioned bottom portion and adapted to coact with the rotatable lever arm; a control adapted to cooperate with said heat responsive device; means for connecting said heat responsive device to said control.

2. A heat responsive device comprising a side wall, a bottom portion, a second bottom portion disposed in a plane other than the plane of the first mentioned bottom portion, a top portion having means associated therewith for clamping said device into position, a rotatable lever arm pivotally fixed to said side wall, a stop for said lever arm, a bimetallic strip secured to said first mentioned bottom portion and adapted to coact with the rotatable lever arm, an adjusting screw threadedly inter-related with the second bottom portion and having its head swivelly connected to the bimetallic leaf; a lever control adapted to rotate said rotatable lever arm in response to a predetermined condition; a flexible connecting means between said rotatable lever arm and the lever control.

3. A temperature responsive device disposed in a zone the temperature of which is to be controlled and comprising a side wall having bottom portions and a top portion integral therewith, the top portion having tapped holes for the reception of screws, a Y shaped lever arm comprising a connecting finger, a latching finger and a reset finger, a bimetallic strip secured to one of said bottom portions and having its free end cooperating with said latching finger, an adjusting screw threadedly inter-engaged with a second bottom portion and having its headed end swivelly connected to the bimetallic strip, a stop integral with the side wall and adapted to cooperate with the reset finger of the Y lever arm; means associated with said Y lever arm to cause rotation of same when the zone to be controlled has reached a pre-determined temperature; means connecting the Y shaped lever arm to the last named means.

4. A temperature responsive device disposed in a zone the temperature of which is varied and comprising a side wall having bottom portions and a top portion integral therewith, the top portion having tapped holes for the reception of screws; a Y shaped lever arm comprising a connecting finger, a latching finger and a reset finger; a bimetallic strip secured to one of said bottom portions and having its free end cooperating with said latching finger; an adjusting screw threadedly inter-engaged with a second bottom portion and having its headed end swivelly connected to the bimetallic strip; a stop integral with the side wall and adapted to cooperate with the reset finger of the Y lever arm; an operating lever; a chain connecting said operating lever to said connecting finger; a second lever arm pivotally fulcrumed below said operating lever and cooperating therewith to move downwardly when the Y lever arm rotates counterclockwise.

5. A temperature responsive device disposed in a zone the temperature of which is to be controlled and comprising a side wall having bottom portions and a top portion integral therewith, the top portion having tapped holes for the reception of screws, a Y shaped lever arm comprising a connecting finger, a latching finger and a reset finger, a bimetallic strip secured to one of said bottom portions and having its free end cooperating with said latching finger, an adjusting screw threadedly inter-engaged with a second bottom portion and having its headed end swivelly connected to the bimetallic strip, a stop integral with the side wall and adapted to cooperate with the reset finger of the Y lever arm; a supporting bracket having vertical side walls with slots therein; an operating lever fulcrumed in one of said vertical walls and passing thru the other vertical wall; a flexible connecting means joining said operating lever and said connecting finger; a spring interposed between said bracket and said operating lever; a second lever arm pivotally fulcrumed in the bracket below said operating lever and cooperating with the last mentioned lever.

6. A temperature responsive device disposed in a zone the temperature of which is to be controlled and comprising a side wall having bottom portions and a top portion integral therewith, the top portion having tapped holes for the reception of screws, a Y shaped lever arm comprising a connecting finger, a latching finger and a reset finger, a bimetallic strip secured to one of said bottom portions and having its free end cooperating with said latching finger, an adjusting screw threadedly inter-engaged with a second bottom portion and having its headed end swivelly connected to the bimetallic strip, a stop integral with the side wall and adapted to cooperate with the reset finger of the Y lever arm; a supporting bracket having vertical side walls with slots therein; an operating lever fulcrumed in one of said vertical walls and passing thru the other vertical wall; a flexible connecting means joining said operating lever and said connecting finger; a spring interposed between said bracket and said operating lever and normally biasing the operating lever downwardly; a second lever arm pivotally fulcrumed in the bracket below said operating lever and free to rotate independent of said operating lever when said operating lever is held in latched position by the latching finger.

7. A temperature responsive device disposed in a zone the temperature of which is to be controlled and comprising a lever arm, a bi-metallic leaf co-acting with said lever arm to arrest rotation thereof during engagement; a supporting bracket having an operating lever associated therewith; a second lever positioned below said operating lever; means connecting said operating lever with said lever arm.

8. In a temperature responsive device, a thermally responsive element mounted in a zone of which the temperature is to be controlled, a lever held against movement by direct engagement with said element until a predetermined temperature is reached, means acting on and adjusting the response of said element to the temperature in the zone, and a leverage biased for movement in one direction and released by movement of said lever.

9. In a temperature responsive device, a bimetallic element mounted in a zone of which the temperature is to be controlled, a lever held against movement by said element until movement thereof responsive to a predetermined temperature, means acting directly on and adjusting the position of said element to determine the temperature at which said lever is released, and a leverage biased for movement in one direction and held against movement by said lever.

10. In a temperature responsive device, a bimetallic element mounted in a zone of which the temperature is to be controlled, a bell crank lever held against rotation by said element until movement thereof upon reaching a predetermined temperature, a screw restraining the movement of said element, and a leverage biasing said bell crank for movement in one direction and including an operating lever, a spring biasing the operating lever for movement in one direction and a second lever actuated by the operating lever upon release of said bell crank by said element.

VERNON R. PAWELSKY.